F. BOOTH.
VEHICLE SPRING AND AXLE CONNECTION.
APPLICATION FILED NOV. 21, 1919.
1,334,883.
Patented Mar. 23, 1920.
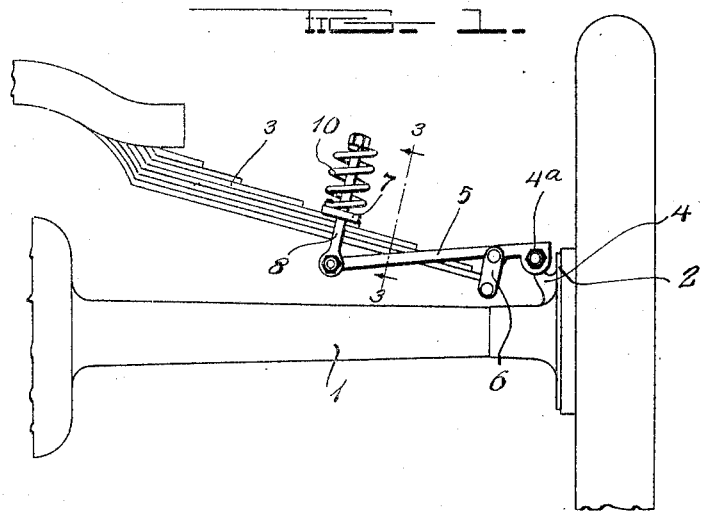
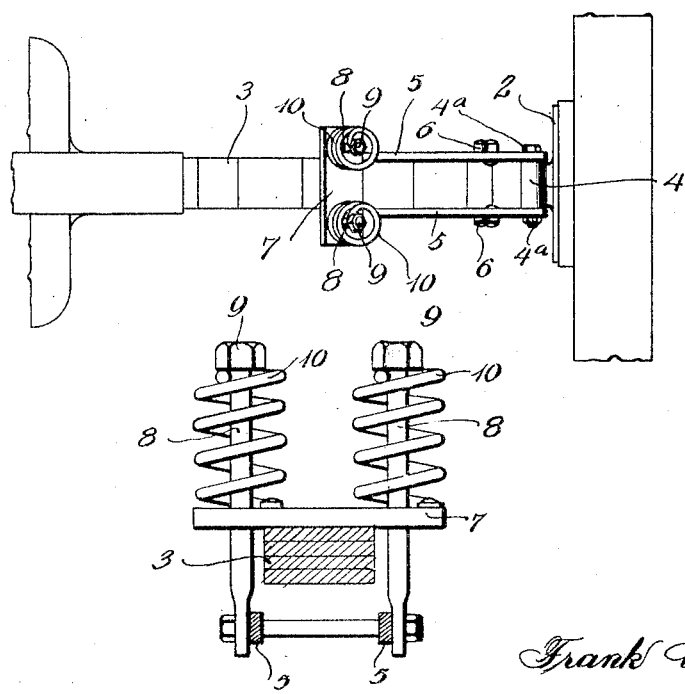
Inventor
Frank Booth
Witnesses
By Victor J. Evans
Attorney

UNITED STATES PATENT OFFICE.

FRANK BOOTH, OF BOWLUS, MINNESOTA.

VEHICLE SPRING AND AXLE CONNECTION.

1,334,883.   Specification of Letters Patent.   Patented Mar. 23, 1920.

Application filed November 21, 1919. Serial No. 339,621.

*To all whom it may concern:*

Be it known that I, FRANK BOOTH, a citizen of the United States, residing at Bowlus, in the county of Morrison and State of Minnesota, have invented new and useful Improvements in Vehicle Spring and Axle Connections, of which the following is a specification.

The object of my present sole invention is the provision of a simple, efficient and durable means to connect the end portion of a vehicle spring and an axle, with a view to assisting the capacity of the spring in absorbing shocks.

To the attainment of the foregoing, the invention consists in the improvement as hereinafter described and definitely claimed.

In the accompanying drawings:

Figure 1 is an elevation illustrative of my novel connection.

Fig. 2 is a plan view of the same.

Fig. 3 is a transverse section taken in the plane indicated by the line 3—3 of Fig. 1, looking in the direction indicated by arrow.

Similar numerals of reference designate corresponding parts in all of the views of the drawings.

I have elected to illustrate my improvement in conjunction with a gear-case housing 1, having an end enlargement 2, but it will be apparent that the improvement may be employed in combination with an axle of any other description equipped with an enlargement 2 at its outer end.

The spring 3 is of the ordinary well known leaf type.

In accordance with my invention I mount a bracket 4 on the upper portion of the enlargement 2, and to said bracket I connect at $4^a$ two vertically swinging arms 5 that rest at opposite sides of the end portion of the spring 3.

Between the end of the spring 3, and at an intermediate point in the length of the arms 5, I interpose a shackle 6, said shackle being pivotally connected to the spring 3 and the arms 5.

At 7 is a bracket that is superimposed upon the spring 3 and extends in front and rear thereof, and extending loosely through the end portions of the said bracket, are rods 8, the lower ends of which are pivotally connected to the inner ends of the arms 5. The upper ends of the rods 8 are threaded to receive nuts 9, and mounted on the rods 8 and interposed between the end portions of the bracket 7 and the nuts 9, are auxiliary coiled springs 10.

The connection $4^a$ alluded to is a pivotal connection, and with this understanding it will be apparent that my improvement will serve to suspend and contribute materially to the shock-absorbing capacity of the spring 3; and it will also be apparent that my improvement is further advantageous because of the facility with which it may be applied to Ford motor cars such as at present in use.

Having described my invention, what I claim and desire to secure by Letters-Patent, is:

1. The combination of an axle having an enlargement on its end portion; a leaf spring spaced above the axle and extending in the same direction as the axle, a shackle connected to and extending upwardly from the end of the spring, vertically swinging arms resting at opposite sides of the end portion of the spring and pivotally connected at their outer ends with the axle enlargement and also pivotally connected at an intermediate point with the shackle, a bracket superimposed upon and extending at opposite sides of the spring, rods pivotally connected to the inner ends of the arms and extending loosely through the end portions of said bracket, nuts mounted on the upper threaded portions of said rods and coiled springs mounted on the rods and interposed between the bracket and the nuts.

2. The combination of an axle having an end enlargement, a spring above and spaced from and extending in the same direction as the axle, vertically swinging arms at opposite sides of the end portion of the spring and pivotally connected with the axle enlargement, a link connection between an intermediate point of said arms and the end of the spring, auxiliary cushioning means superimposed upon the spring, and means connected with said auxiliary cushioning means and also connected with the inner end portions of the arms.

In testimony whereof I affix my signature.

FRANK BOOTH.